(12) United States Patent
Ashida (10) Patent No.: US 7,946,733 B2
(45) Date of Patent: May 24, 2011

(54) DISCHARGE LAMP AND LIGHT-SOURCE APPARATUS

(75) Inventor: Katsumi Ashida, Saitama (JP)

(73) Assignee: Hoya Candeo Optronics Corporation, Toda-shi (JP)

( * ) Notice: Subject to any disclaimer, the term of this patent is extended or adjusted under 35 U.S.C. 154(b) by 516 days.

(21) Appl. No.: 12/049,558

(22) Filed: Mar. 17, 2008

(65) Prior Publication Data

US 2008/0232108 A1    Sep. 25, 2008

(30) Foreign Application Priority Data

Mar. 20, 2007   (JP) ................................ 2007-072071

(51) Int. Cl.
| F21V 7/07 | (2006.01) |
| F21V 21/10 | (2006.01) |
| F21V 17/06 | (2006.01) |
| F21V 17/00 | (2006.01) |
| F21V 33/00 | (2006.01) |
| H01R 33/02 | (2006.01) |
| H01R 33/08 | (2006.01) |
| H01R 4/50 | (2006.01) |
| H01R 13/62 | (2006.01) |

(52) U.S. Cl. ................... 362/296.09; 362/429; 362/448; 362/95; 362/443; 439/336; 439/366; 439/232; 439/242

(58) Field of Classification Search .................. 362/649, 362/651, 296.09, 443, 640, 647, 429, 436; 439/232, 233, 242, 261, 366, 336; 313/318.03, 313/318.1, 631–632
See application file for complete search history.

(56) References Cited

U.S. PATENT DOCUMENTS

| 4,628,423 | A | * | 12/1986 | Ogle | ............................. | 362/341 |
| 4,928,210 | A | * | 5/1990 | Hayakawa et al. | ...... | 362/217.14 |
| 5,971,564 | A | * | 10/1999 | Wang | ............................. | 362/263 |
| 6,582,253 | B1 | * | 6/2003 | Lau | ............................. | 439/646 |
| 6,641,419 | B1 | * | 11/2003 | Richardson | .................... | 439/230 |
| 6,824,409 | B2 | * | 11/2004 | Thiele et al. | ................... | 439/242 |
| 6,971,917 | B2 | * | 12/2005 | Faust et al. | .................... | 439/619 |
| 7,344,398 | B2 | * | 3/2008 | Sibout | ............................. | 439/232 |
| 7,484,863 | B1 | * | 2/2009 | Aubrey | ......................... | 362/294 |
| 7,597,575 | B2 | * | 10/2009 | Tufano et al. | ................. | 439/239 |

FOREIGN PATENT DOCUMENTS

| JP | 64-55713 | 3/1989 |
| JP | 2003297228 A | 10/2003 |
| JP | 3124444 | 8/2006 |

* cited by examiner

*Primary Examiner* — Jong-Suk (James) Lee
*Assistant Examiner* — David J Makiya
(74) *Attorney, Agent, or Firm* — Wolf, Greenfield & Sacks, P.C.

(57) ABSTRACT

A discharge lamp (10) has a fixing base (20) on one end. In some embodiments, the fixing base comprises a cylindrical first body portion (21) having a pair of notches (21H), a cylindrical second body portion being larger than the diameter of the first body portion and having a joint (23H), and a groove portion (25) formed in between the first and second body portion and having an equal or less diameter of a space of the pair of notches. A first body portion and a stepped surface (21B) of the groove portion is contacted to a base surface of a lamp holder (50) when the fixing base is inserted to the lamp holder.

18 Claims, 11 Drawing Sheets

DISCHARGE LAMP AND LIGHT-SOURCE APPARATUS

CROSS-REFERENCE TO RELATED PATENT APPLICATION

This application claims the benefit of Japanese Patent Application No. 2007-072071 filed on 20 Mar. 2007 in the Japan Patent Office, the disclosure of which is incorporated by reference herein in its entirety.

FIELD OF INVENTION

The present invention is generally related to a discharge lamp irradiating light including ultraviolet radiation and a light-source apparatus comprising the discharge lamp.

DESCRIPTION OF THE RELATED ART

By using a discharge lamp, the light including ultraviolet radiation is processed to an object to be processed in order to harden a coating, clean a surface of semiconductor wafer or glass base, or circumference exposure or surface modification. A light-source apparatus having such a discharge lamp, for example, Japanese Registered Utility Model No. 3124444 discloses that the light irradiated from a discharge lamp is reflected and collected 20 by an elliptic mirror, guided to an exit, and then irradiated to the outside by a light guiding member or light guide, such as an optical fiber bundle, connected to the exit.

In a housing of such a light-source apparatus, a fixing base of a discharge lamp is connected to a lamp holder having an elliptic mirror formed around it. If the discharge lamp is inserted into a proper position of the lamp holder, a bright point of the discharge lamp matches a first focal point of the elliptic mirror. Then, an optical fiber bundle fixed to an exit of a second focal point of the elliptic mirror is arranged. Such a configuration enables to efficiently guide the irradiated light from the bright point of the discharge lamp to the beam exit of the optical fiber bundle.

However, when an operator changes the discharge lamp, a clamp screw might be tightened without fully inserting the fixing base of the discharge lamp. Even if the fixing base is not fully inserted to the lamp holder, the discharge lamp is lighted when the power is applied to the base. However, a bright point of the discharge lamp is not located at the elliptic mirror at the first focal point, and illuminance at the exit of an optical fiber bundle is not sufficient. When the cleaning of a surface of a semiconductor water or a glass base cannot be completed, the operators have found that the fixing base was not fully inserted into the lamp holder after they investigated the reason of the failure.

Moreover, supposing that the axial direction of the discharge lamp is in Z-axis direction, the bright point of the discharge lamp is changed even on the X-Y surface. Because the fixing base of the discharge lamp has an approximately cylindrical shape, the discharge lamp may be rotated around the axis in the lamp holder. Then, desired illuminance may not be obtained because the position of the bright point of discharge lamp is off the first focal point.

SUMMARY OF INVENTION

Embodiments of the present invention aim to provide a discharge lamp and a light-source apparatus having the discharge lamp which cannot be clamped to the lamp holder unless the operator attaches the discharge lamp to make the bright point of the discharge lamp come to the first focal point at the elliptic mirror.

A discharge lamp according to a first aspect comprises a fixing base on one end, which is inserted to a lamp holder. The fixing base also includes a cylindrical first body portion having a pair of notches, a cylindrical second body portion being larger than the diameter of the first body portion and having a joint, a groove portion formed in between the first and second body portions, and having a diameter equal to or less than a space between the pair of notches, wherein when the fixing base is fixed to the lamp holder, a stepped surface of the groove portion and the first body portion contacts a base surface of the lamp holder. Because the discharge lamp according to the first aspect has a pair of notches, a first body portion can be inserted to a lamp holder and a second body portion cannot be inserted more than a predetermined depth. Then, the diameter of groove is equal or less than the space between the pair of notches so that the discharge lamp can be rotated at a predetermined position. The groove portion and a stepped surface of the first body contact a base surface of the lamp holder. Therefore, the bright point of the discharge lamp can be located at a predetermined position.

According to a second aspect, a discharge lamp has a lamp holder which includes a rotating portion which has an inset portion and which rotates from a first position to a second position. When the discharge lamp rotates, the joint contacts the inset portion of the rotating portion so as to rotate the rotating portion from the first position to the second position.

In embodiments of the discharge lamp according to the second aspect, as the fixing base rotates, the rotating portion of the lamp holder rotates due to the joint of the second body portion connecting to the inset portion of a rotating part of the lamp holder. The discharge lamp being fixed to the lamp holder by rotation of the rotating portion of the lamp holder prevents operators from attaching the fixing base to a wrong position.

According to a third aspect, the lamp holder of the discharge lamp further includes a clamp member which clamps the fixing base, and when the rotating portion is at the first position, the fixing base is not clamped by the clamp member, and when the rotating portion is at the second position, the fixing base is clamped by the clamp member.

In this configuration, when the rotating portion is located at the first position, the fixing base cannot be clamped by a clamp member. Therefore, operators do not attach the fixing base to a wrong position, thus the bright point of the discharge lamp can be located in the right position.

According to a fourth aspect, the discharge lamp has a lamp holder and the lamp holder further includes a plunger retaining a rotation position of the fixing base. The first or second body portion of the discharge lamp has a concave portion where the plunger enters, and when the rotating portion is at the second position, the concave portion receives the plunger.

When the fixing base rotates at the second position of the lamp holder, the rotation of the fixing base is held at the position. Also, with the feeling of inserting of the plunger to a concave portion, operators recognize when the rotating portion has rotated to the second position.

According to a fifth aspect, the concave portion of the discharge lamp includes a counterbore or a slit groove which extends in an axial direction of the fixing base. When the concave portion is formed at the second body, a counterbore or slit groove portion can be made easily. By using the counterbore or slit groove portion, the discharge lamp can be held at the second position.

According to a sixth aspect, a flat surface is formed on the inset portion of the rotating portion, the joint has a flat surface at at least one part, and the flat surface of the joint connects to the flat surface of the inset portion.

Because a flat surface of the joint and a flat surface of the rotating portion are connected, the joint of the fixing base rotates the rotating portion.

According to a seventh aspect, the discharge lamp has a first mark indicating the first position and a second mark indicating the second position. The marks are formed on an outer surface of the rotating portion, a window is formed in the lamp holder, and the fixing base rotates the rotation part to recognize the change of the first mark to the second mark through the window.

According to this configuration, operators can visually check that the discharge lamp is either at the first or second position through the window. In some embodiments, it the first mark is red or says "open", operators can recognize that the discharge lamp is not yet set to the right position. Also, it the second mark is blue or says "close", operators can recognize that the discharge lamp is set to the right position.

According to an eighth aspect, a light-source apparatus includes a light guiding member with an exit, a discharge lamp of previous aspects, a mirror reflecting the irradiated light from the discharge lamp, a lamp holder for inserting and fixing the fixing base, and a housing storing the discharge lamp, the mirror, and the lamp holder inside and having the exit formed thereof.

The discharge lamp is surely clamped at the lamp holder so that a failure does not occur due to an insufficient amount of light in the light guiding member led from the light-source apparatus.

According to some embodiments of the present invention, the fixing base of the discharge lamp can be fixed to the lamp holder only when the discharge lamp is set such that the position of the bright point of the discharge lamp comes to the first focal point of the elliptic mirror. Therefore, the discharge lamp does not light under the condition of insufficient illuminance. Also, the illuminant from the light guiding member of the light-source apparatus irradiates proper illuminance.

DESCRIPTION OF PREFERRED EMBODIMENT(S)

<Configuration of a Discharge Lamp Having a Fixing Base>

Embodiments of discharge lamps are explained as follows.

Figure 1:
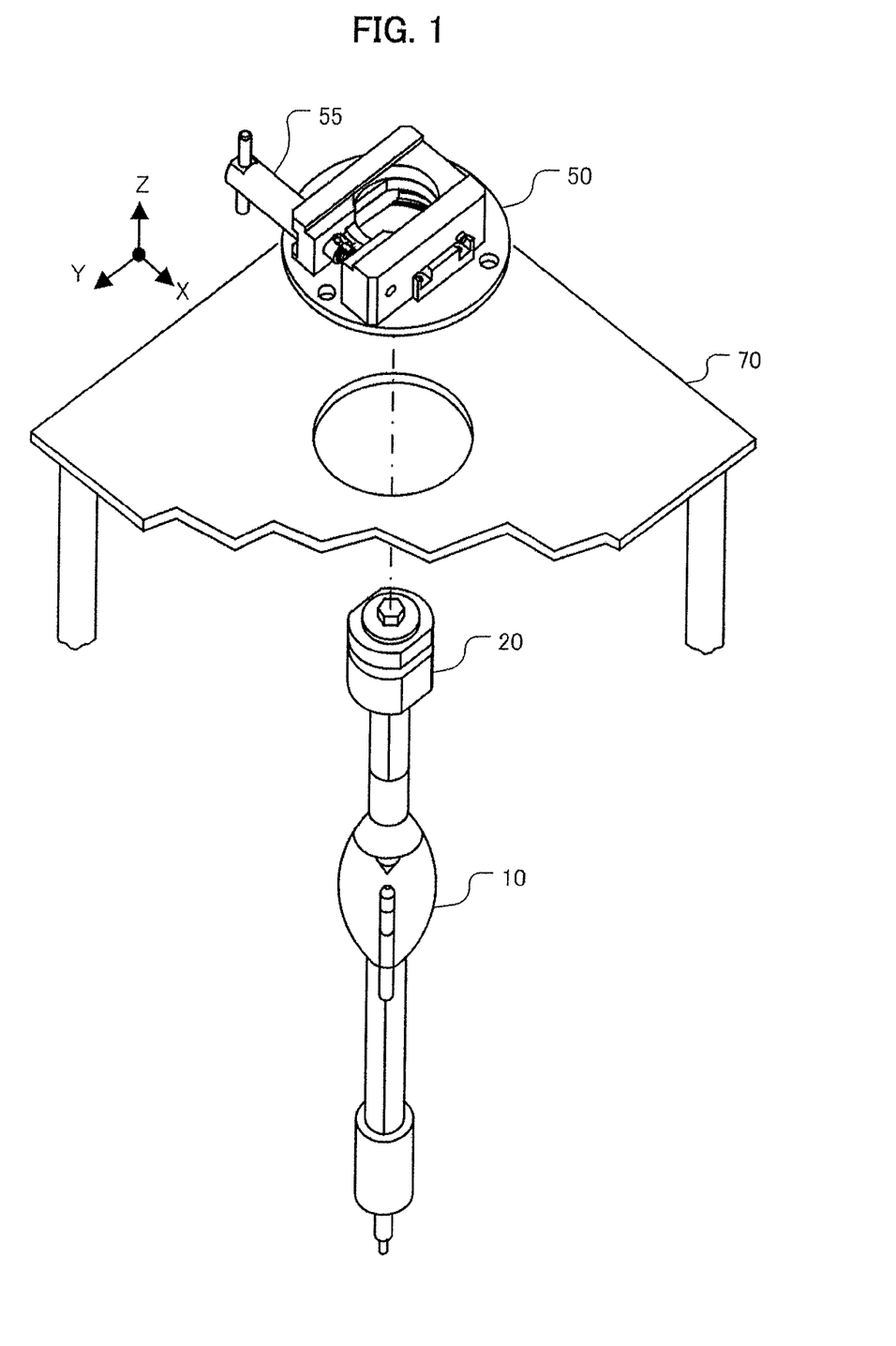
FIG. 1 shows one embodiment of discharge lamp comprising a fixing base.

FIG. 1 is a schematic view showing the configuration of a discharge lamp according to one embodiment of the present invention. In FIG. 1, a discharge lamp 10 comprises a fixing base 20 at one end. The discharge lamp 10 can be, for example, a mercury xenon lamp or high-pressure mercury lamp, and it irradiates a light containing ultraviolet light. In this embodiment the discharge lamp 10 is preferably a short arc lamp with a bright point which can be a point light. For example, the high-pressure mercury lamp may include a bulb that is made from quartz glass, and an anode and cathode which are made from tungsten. Also, molybdenum conductive toil is used as a stem, and the inside of the bulb is filled with mercury and rare gas. An electric source is stably provided to the fixing base 20 which is a lamp mounting portion.

The discharge lamp 10 with the fixing base 20 side up is inserted to a lamp holder 50. The lamp holder 50 is attached to a lamp holder mounting bracket 70.

<Configuration of a Fixing Base>

Figure 2A:
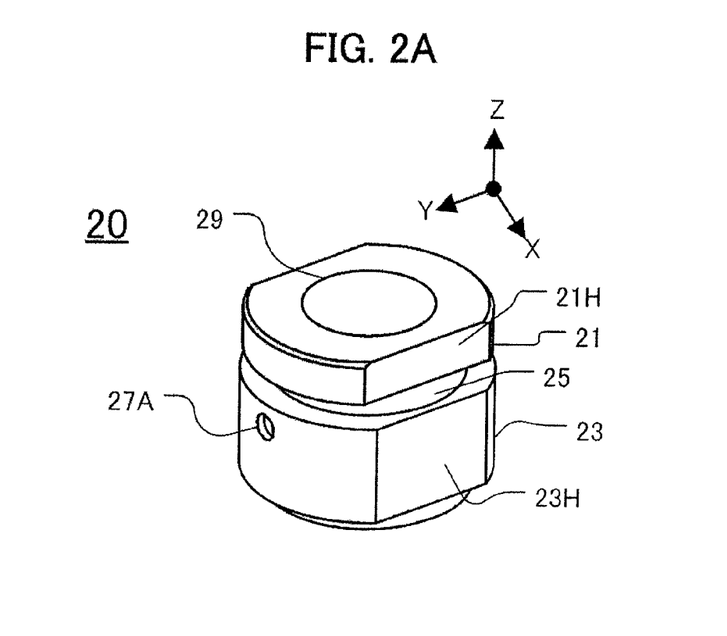
FIGS. 2A-2C shows a first embodiment of a fixing base.
Figures 2B, 2C:
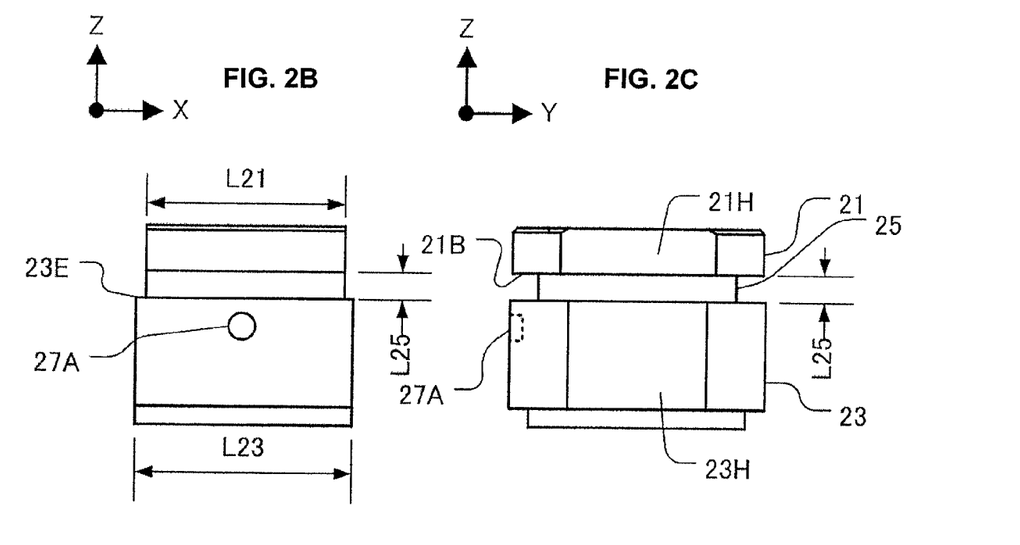
Figure 2D:
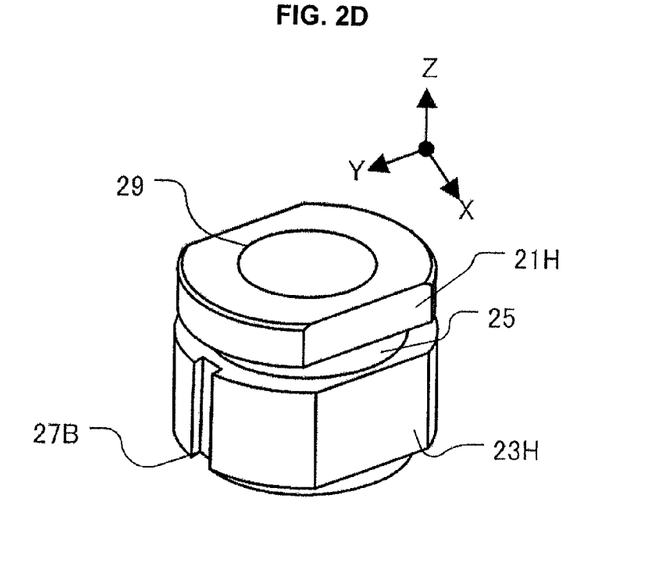
FIGS. 2D-2F shows a second embodiment of a fixing base.
Figures 2E, 2F:
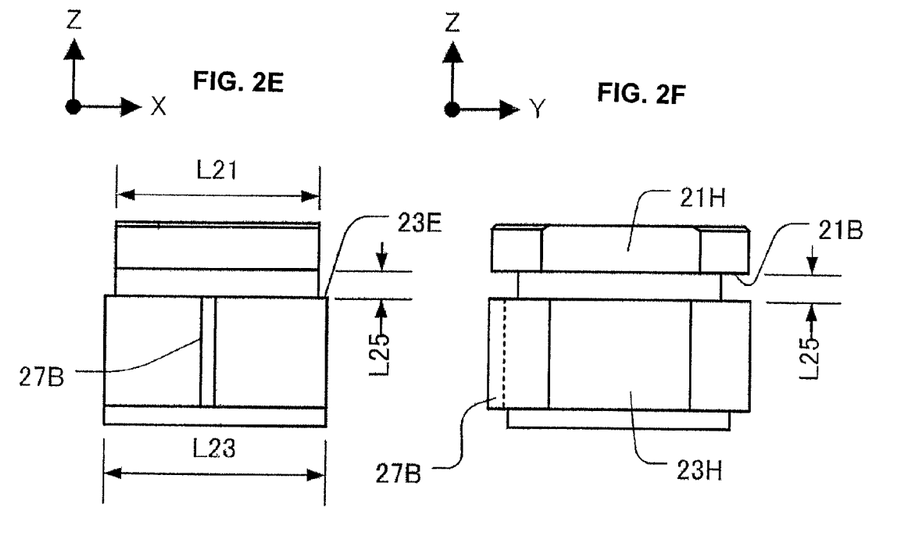

FIGS. 2A-2C show a first embodiment of the fixing base 20, and FIGS. 2D-2F show a second embodiment of the fixing base 20. FIG. 2A($a1$) is a perspective view of the first embodiment. FIG. 2B is a plan view of the first embodiment as seen from a Y-axis direction FIG. 2C is a plan view of the first embodiment seen from an X-axis direction. Similarly, FIG. 2D is a perspective view of the second embodiment. FIG. 2E is a plan view of the second embodiment as seen from a Y-axis direction. FIG. 2F is a plan view of the second example seen as from an X-axis direction. This fixing base 20 is inserted to the lamp holder 50, and fixed to the lamp holder 50 by a clamp screw 55 (see FIG. 1) as discussed below.

The fixing base 20 comprises a first body portion 21, a second body portion 23, and a cylindrical groove portion 25 formed in between the first body portion 21 and the second body portion 23. At an opening 29 formed at a central axis of the fixing base 20, a stem of the discharge lamp 10 and the opening 29 are fixed by glue. The first body portion 21 has a cylindrical shape, and notches 21H, which are cut flatly, are axisymmetrically formed on the fixing base 20.

The second body portion 23 has a cylindrical shape and joints 23H, which are cut flatly, are axisymmetrically formed on the fixing base 20. Also, as shown in FIGS. 2A-2C, at the second body portion 23 of the first embodiment, a counterbore 27A as a concave portion 27 is formed. As shown in FIGS. 2D-2F, at the second body portion 23 of the second embodiment, a slit groove portion 27B is formed in the axis direction. In between the first body portion 21 and the second body portion 23, a cylindrical groove portion 25 with a width L25 in the axis direction is formed. Therefore, a standard stepped surface 21B is formed on the first body portion 21 and the cylindrical groove portion 25, and a stopper surface 23E stopping insert is formed on the second body portion 23 and the cylindrical groove portion 25. Also, the width L25 of the cylindrical groove portion 25 is regulated based on a relationship to a clamp portion 54.

FIGS. 3A-3D are plan views of the fixing base 20 seen from the Z-axis direction, and also show some shapes of the notches 21 H formed on the first body portion 21 and joints 23H formed on the second body portion 23. A distance L23 of a pair of joints 23H formed on the second body portion 23 is larger than a distance L21 of a pair of the notches 21H formed on the first body portion 21.

Figure 3A:
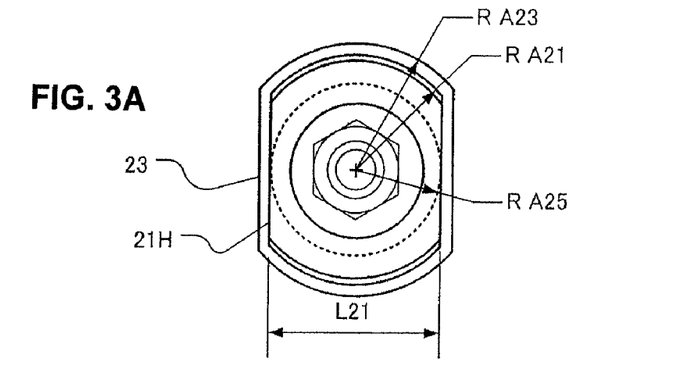
FIGS. 3A-3D show plan views of the outline of fixing bases as seen from the z-axis direction.

The fixing base 20 shown in FIG. 3A is the same shape of the fixing base 20 of FIGS. 1, and 2A-2F. A cylindrical diameter RA21 of the first body portion 21 is narrower than a cylindrical diameter RA23 of the second body portion 23. A diameter RA25 of the cylindrical groove portion 25 is narrower than the cylindrical diameter RA21 of the first body portion 21. Also the diameter RA25 of the cylindrical groove portion 25 has a length that is the same as or less than the distance L21 of the pair of notches 21H formed on the first body portion 21.

There is a pair of extension parts 54T at the lamp holder 50, and a gap L54S (see FIG. 4A) is larger than the distance L21 of the pair of notches 21H, and is smaller than the distance L23 of the pair of joints 23H. Therefore, when the discharge lamp 10 is inserted to the lamp holder 50, a stopper surface 23E shown in FIGS. 2B and 2E is touched to the extension parts 54T of the clamp portion 54 of the lamp holder 50. Accordingly, the discharge lamp 10 is not inserted more than the predetermined depth.

Figure 3B:
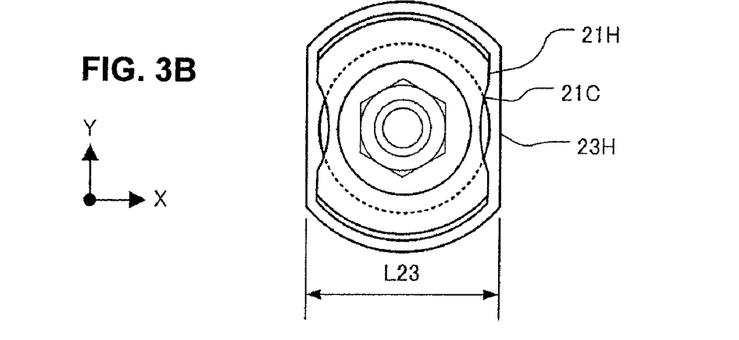

On the fixing base 20 shown in FIG. 3B, U-shaped groove portions 21C are formed at the pair of notches 21H formed on the first body portion 21. Event though such U-shape groove portions 21C are formed instead of the notches 21H, they are not a problem functionally. Instead of the U-shape groove portions 21C, V-shape groove portions, which are not illustrated, can also be applied.

Figure 3C:
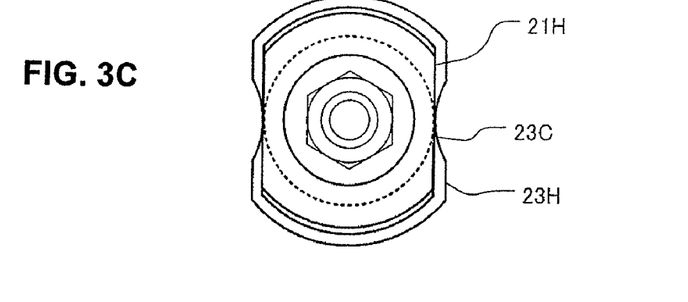

On the fixing base 20 shown in FIG. 3C, U-shaped groove portions 23C are formed at the joints 23H formed on the first body portion 21. Even though the U-shape groove portions 23C are formed at the joints 23H, the joints 23H are attached to a rotating ring 53 of a lamp holder 50 (see FIGS. 4A, 4B and 5) and enable rotation of the rotating ring. V-shape groove portions, which are not illustrated, also may be applied instead of U-shaped groove portions.

Figure 3D:
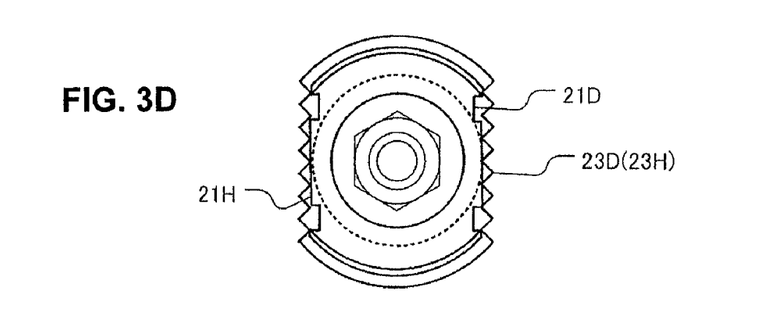

On the fixing base 20 shown in FIG. 3D, concave portions 21D are formed at the pair of notches 21H formed on the first body portion 21. Even though such concave portions 21D are formed, they are not a problem it they serve as notches entirely. Also, on the fixing base 20 shown in FIG. 3D, saw teeth 23D are formed at the pair of joints 23H formed on the second body portion 23. Even though such saw teeth 23D are formed at the joints 23H, they can attach to the rotating ring 53 and enable rotation of the rotating ring 53.

<Configuration of a Lamp Holder>

Figure 4A:
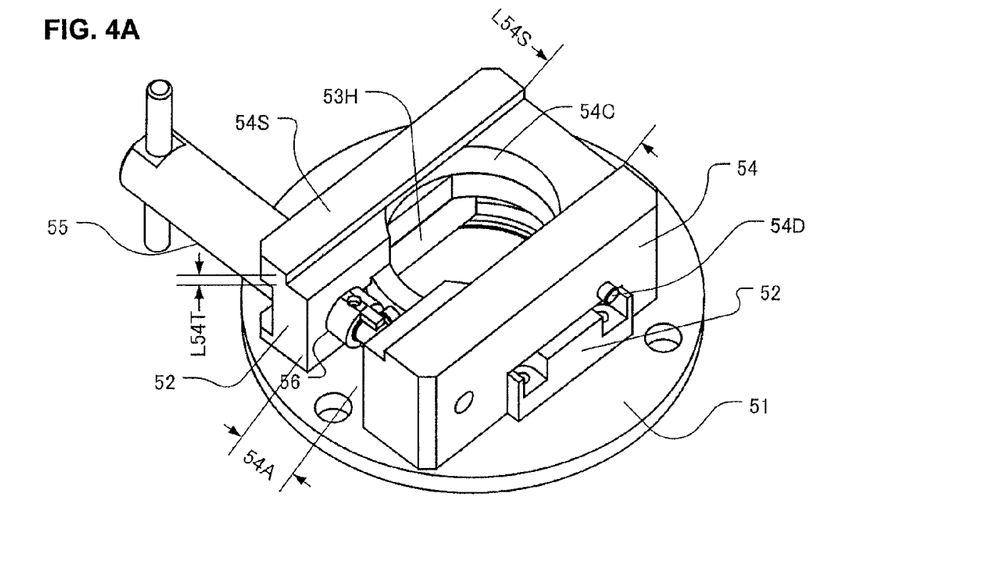
FIG. 4A is a cross-sectional view of a lamp holder according to one embodiment.
Figure 4B:
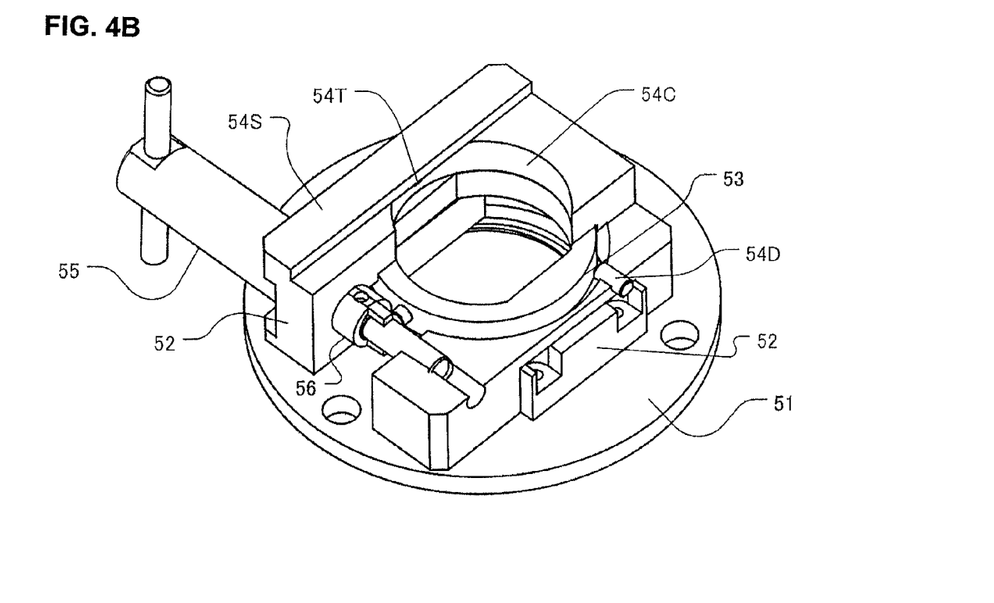
FIG. 4B is a cross-sectional view of the clamp portion of which one part is cut.
Figure 5:
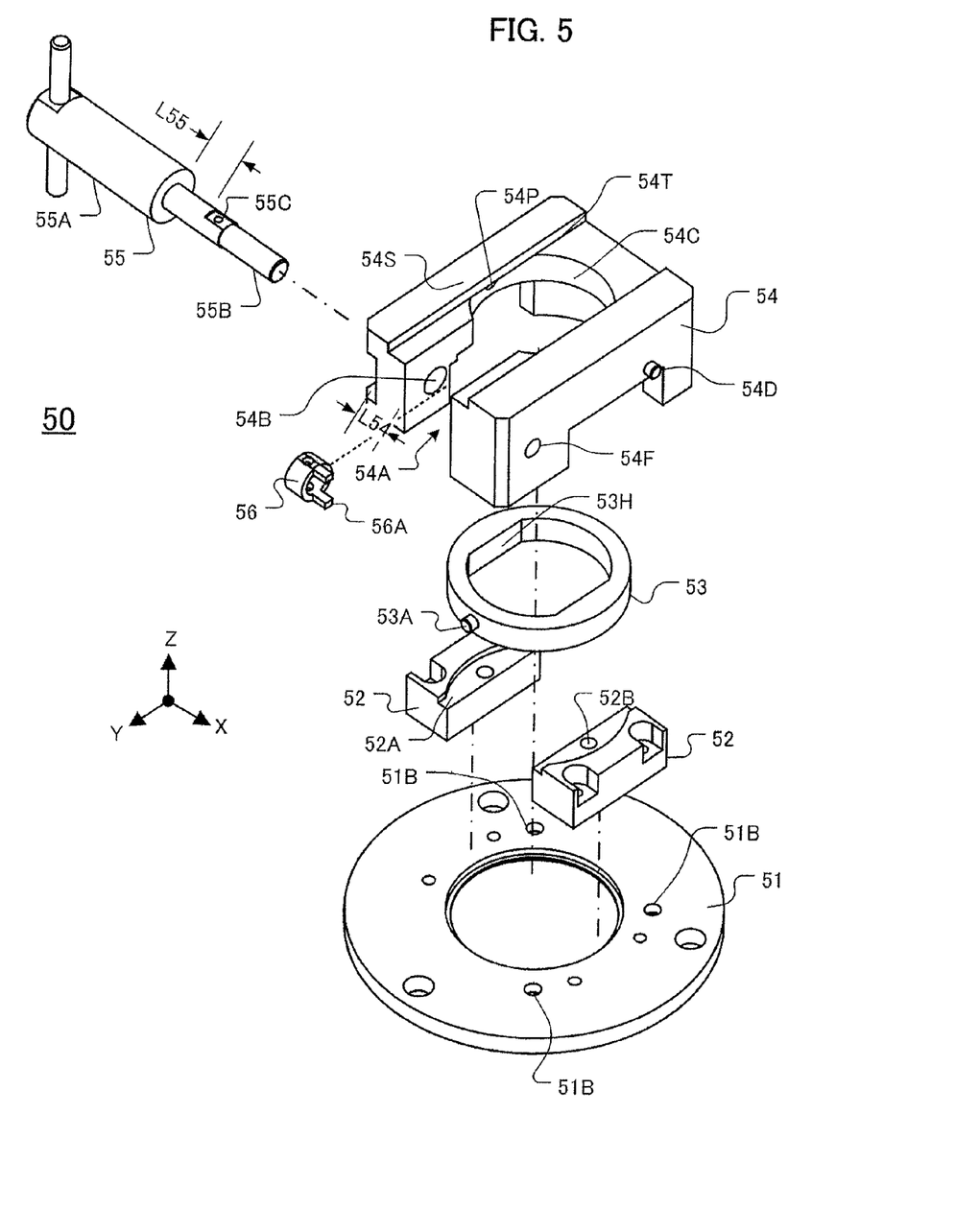
FIG. 5 is a development view of a lamp holder according to one embodiment.

FIG. 4A is a perspective view of a lamp holder 50, and FIG. 4B is a perspective view with a portion of clamp portion 54 cut away. Also, FIG. 5 is a development view of the lamp holder 50. FIG. 6 is a perspective view of the lamp holder 50 seen from the opposite side of FIG. 5.

The lamp holder 50 comprises a holder base 51, a rotating ring cradle 52, a rotating ring 53, a clamp portion 54, and clamp screw 55. The rotating ring cradle 52 supporting the rotating ring 53 and the clamp portion 54 are fixed to the holder base 51.

A rotating surface 52A for the rotating ring 53 rotating on a predetermined surface is formed on the rotating ring cradle 52, and a plunger hole 52B for receiving a ball plunger BP2 (see FIG. 7) is formed on the rotating surface 52A. The ball plunger BP2 keeps the rotating ring 53 at the first position.

A project pin 53A is embedded and fixed to the periphery of the rotating ring 53. The project pin 53A has two roles. One is to control the rotation of the clamp screw 55. The other role is to collide with the stopper pin 54D in order to control the rotating ring 53, that is, to prevent the discharge lamp 10 from rotating more than a predetermined rotation. A counterbore 53B (see FIG. 9) for the ball plunger BP2 attached to the rotating ring cradle 52 is formed at the bottom of the rotating ring 53. An inner surface of the rotating ring 53 forms a circular surface and a line surface 53H as an insert portion. The line surface 53H is connected to the joint 23H formed on the second body portion 23 of the fixing base 20. Therefore, the space between the pair of line surfaces 53H is relatively wider than the space between the pair of the joints 23H. Because the pair of the line surfaces 53H is used to rotate the rotating ring 23, the U-shaped groove portion 23C or a V-shaped groove portion at the second body portion 23 can be applied.

Figure 6A:
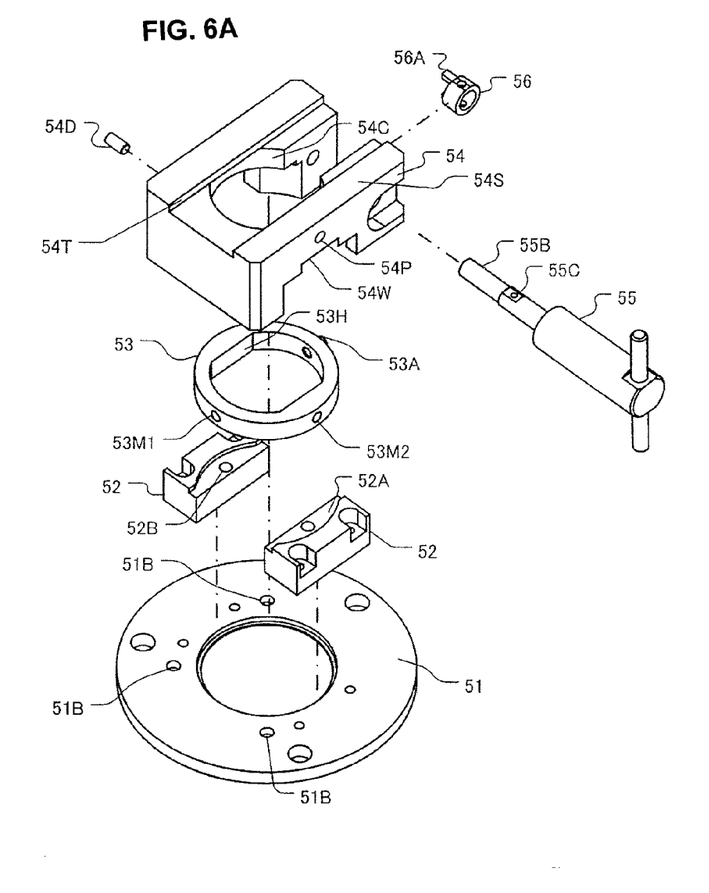
FIG. 6A is a development view of the lamp holder of FIG. 5 as seen from the opposite side as compared to FIG. 5.

As shown in FIG. 6A(a), a blue mark 53M1 and red mark 53M2 are formed at the periphery of the rotating ring 53. The blue mark 53M1 is positioned at 90 degrees from a red mark 53M2 in the rotation axis, and the blue mark 53M1 is formed at the opposite side of the project pin 53A.

The blue mark 53M1 is shifted to 90 degrees with mounting of the discharge lamp 10 and it enables the tightening of the clamp screw 55. Therefore, besides the blue mark, "close" or "OK" can be incused. For the red mark 53M2, "open" or "NG" can be incused because it has opposite meaning from the blue mark.

The clamp portion 54 has a slit 54A and a circular clamp surface 54C. At the slit 54A, a hole 54B for the clamp screw 55 and a screw 54F are prepared. The clamp portion 54 is fixed at one of the holes 51B formed at three positions on the holder base 51, and one side of the slit 54A is not fixed. Therefore, when the clamp screw 55 is tightened, the slit 54A becomes narrow and the clamp surface 54C tightens the second body portion 23. Also, the clamp portion 54 has a base surface 54S, and the standard surface 54S has an extension portion 54T extended from inner periphery of the circle clamp surface 54C in direction of central axis. The space L54S of the pair of extending parts 54T is larger than the distance L21 of the notches 21H at the first body portion 21 and smaller than the cylindrical diameter (RA21*2) of the first body portion 21. Also, the width L54T of the extending portion 54T in axis direction is smaller than the width L25 of the cylindrical groove portion 25 at fixing base 20. Thus, the cylindrical groove portion 25 of the fixing base 20 penetrates the extending portion 54T and then the extending portion 54T enables the rotation of the fixing base 20.

The stopper surface 23E of the fixing base 20 shown in FIG. 2B attaches the bottom of the extending portion 54T at the clamp portion 54. Therefore, the fixing base 20 of the discharge lamp 10 is not inserted more than predetermined amount. The width L54T of the extending portion 54T in axis direction is relatively smaller than the width L25 of the cylindrical groove portion 25 in axis direction.

Thus, after the fixing base 20 is inserted to the clamp portion 54, and the stopper surface 23E of the fixing base 20 is attached to the bottom of the extending portion 54T, the fixing base 20 can rotate 90 degrees. Also, releasing the discharge lamp 10 after rotating 90 degrees, the discharge lamp 10 is weighted down of its weight and the standard stepped surface 21B of the first body portion 21 and the standard surface 54S of the clamp portion 54B are attached to each other, and then the position in Z-axis direction of a bright point of the discharge lamp 10 is determined.

A stopper pin 54D is formed at the clamp portion 54, and controls so that the projection pin 53A of the rotating ring 53 does not rotate more than predetermined rotation. Also, the plunger hole 54P for inserting the ball plunger BP1 is formed at the circular clamp surface 54C of the clamp portion 54 so as to prevent the fixing base 20 from rotating more than predetermined angle. The ball plunger BP1 is attached to the plunger hole 54P at the clamp portion 54. The ball plunger BP1 is attached to the counterbore 27A of the second body portion 23 shown in FIG. 2A or the slit groove portion 27B shown in FIG. 2E.

Figure 6B:
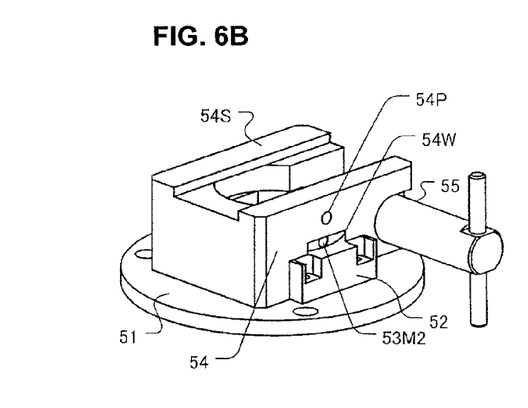
FIG. 6B is a perspective view of the lamp holder according to one embodiment.

Also, as shown in FIGS. 6A and 6B, there is a window 54W at the bottom of the plunger hole 54P of the clamp portion 54. As shown in FIG. 6B, operators can recognize the blue mark 53M1 or the red mark 53M2 through the window 54W. When the discharge lamp 10 is not attached, the operators can see the red mark 53M2 from the window 54W. On the other hand, when the operators attach the discharge lamp 10 and rotate it 90 degrees, they can see the red mark 53M2 changes to the blue mark 53M1 from the window 54W.

A clamp screw 55 includes a handle 55A and a screw 55B. An attaching surface 55C, to which the rotational restriction ring 56 is attached, is formed at the space between the handle 55A and the screw 55B. A distance L55 between the handle 55A and the rotational restriction ring 56 is relatively bigger than the width L54, which is one side of the slit 54A of the clamp 54, and the rotational restriction ring 56 controls the screw depth of clamp screw 55. Therefore, the operators can narrow or tighten the width of the slit 54A of the clamp 54A by rotating the clamp screw 55 a few rotations. Note that besides the clamp screw 55, other means, for example, a cam with screw, can be used i to tighten the clamp 54.

The rotational restriction ring 56 has two projection portions 56A. A space, into which a projection pin 53A of the rotating ring 53 is inserted, is formed between the two projection portions 56A. When a projection pin 53A is located between two projection portions 56A, the clamp screw 55 cannot be tightened even it operators try to rotate. <Procedure of Mounting a Discharge Lamp to a Lamp Holder>

Figure 7A:
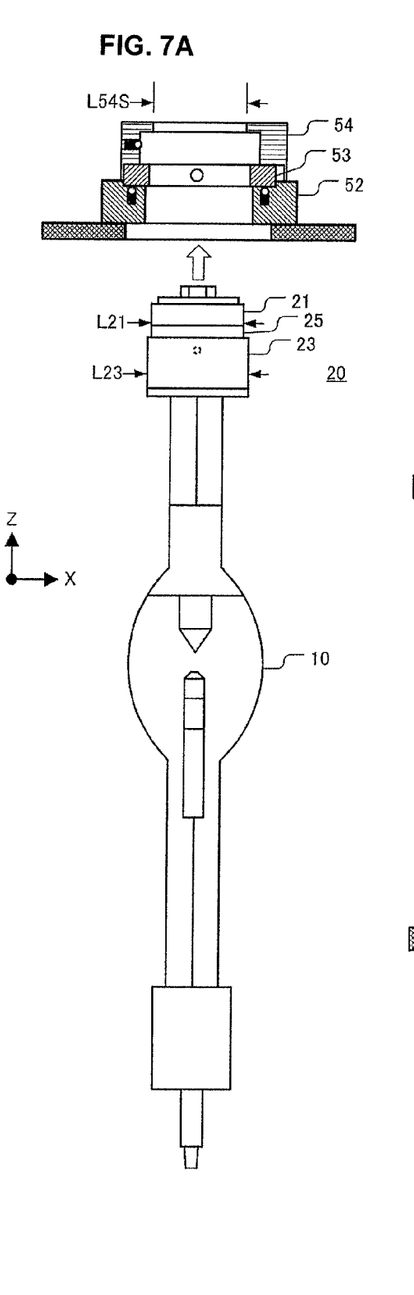
FIGS. 7A-7C explain mounting action of the discharge lamp to the lamp holder.
Figure 7B:
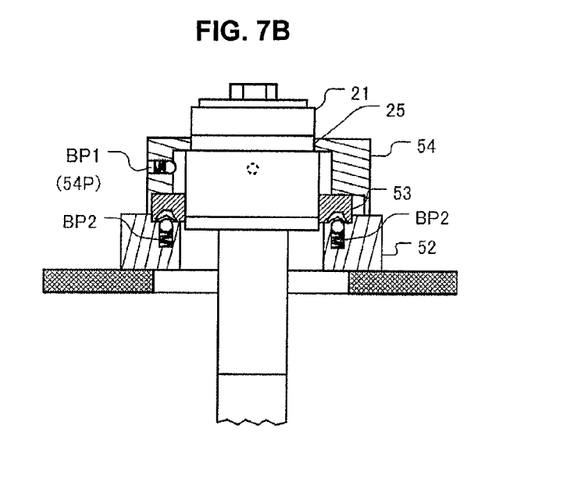
Figure 7C:
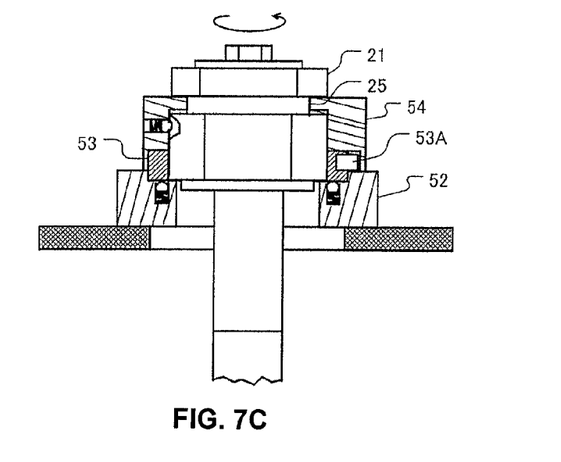

FIG. 7 explains a procedure to mount the discharge lamp 10 to the lamp holder 50. FIGS. 7A-7C show cross sectional views of the lamp holder 50.

In FIG. 7A, the discharge lamp 10 with the fixing base 20 side up is inserted into the lamp holder 50 from the bottom in Z-axis. The first body 21 cannot be inserted into the lamp holder 50 unless operators face the notches 21H formed on the first body 21 in X-axis. The space L54S of a pair of extending portions 54T is smaller than a cylindrical diameter (RA21*2) of the first body portion 21. The rotating ring 53 is retained by a ball plunger BP2 and counterbore 53b so that the stopper surface 23E attaches the bottom surface of the rotating ring 53 and the fixing base 20 of the discharge lamp can be inserted into the clamp 54.

Because the distance L21 of the notches 21H at the first body 21 is narrower than the space L54S, the operators can insert the clamp 54 of the fixing base 20 into the extending portion 54T. However, the stopper surface 23E is attached to the extending portion 54T of the lamp holder 50, because the distance L23 of the pair of joint 23H is larger than the space L54S, thus the operators cannot insert the fixing base 20 higher than the predetermined position.

The fully inserted discharge lamp 10 is shown in FIG. 7B. In this condition, the line surfaces 53H of the rotating ring 53 and the joints 23H formed at the second body portion 23 are attached. However, an attachment of the line surfaces 53H and the joints 23H can be loose at least it enables rotation of the rotating ring 53. Thus, it the operators remove their hands from the discharge lamp 10 with the condition shown in FIG. 7B, the lamp will fall out by its weight. Also, even it the operators tighten the clamp screw 55 in this condition, the projection pin 53A of the rotating ring 53 is inserted between the projection portions 56A of the rotational restriction ring 56 so that the operator cannot tighten the clamp screw 55. So, the operators rotate the discharge lamp 10 90 degrees in the condition that it is fully inserted. This situation is shown in FIG. 7C.

By rotating the discharge lamp 10 90 degrees, the notches 21H turn in the Y-axis direction, and the standard stepped surface 21B of the first body portion 21 is hooked to the clamp portion 54. It the operator leaves the discharge lamp 10 in this condition, the standard stepped surface 21B of the first body portion 21 touches the standard surface 54S of the clamp portion 54 by the weight of the discharge lamp 10. This standard surface 54S is set such that the bright point of the discharge lamp 10 focuses to a first focal point F1 of an elliptic mirror. In order to make operators recognize that they have rotated the discharge lamp 10 90 degrees, the plunger BP1 attached to the clamp portion 54 is inserted into the concave portion 27 formed at the second body portion 23. By plunger BP1 being inserted into the concave portion 27, the discharge lamp 10 is retained in a condition in which it is rotated 90 degrees. By rotating the discharge lamp 10 around axis 90 degrees, the position of X-Y surface (Z-axis rotating direction) can be fixed.

Also, by rotating the discharge lamp 10 around axis 90 degrees, the joints 23H formed on the second body portion 23 attach to the line surfaces 53H of the rotating ring 53 and the discharge lamp 10 rotates the rotating ring 53 90 degrees. Then, the projection pin 53A of the rotating ring 53 is rotated 90 degrees. There is no projection pin 53A of the rotating ring 53 in between a pair of projection portions 56A of the rotational restriction ring 56, enabling the operators to tighten the clamp screw 55.

As explained above, when the operators insert the discharge lamp 10 into the lamp holder 50, unless the discharge lamp 10 is fully inserted and rotated in the lamp holder 50, the discharge lamp 10 cannot be inserted. In other words, the discharge lamp 10 cannot be inserted other than to a predetermined position. Therefore, when the discharge lamp can be inserted, the bright point of the discharge lamp 10 is exactly at the first focal point, and a gap of focal point occurred at X-Y surface and a position of X-Y flat surface (Z-axis rotating direction) can be positioned. Thus a light-source apparatus 100 enables stable irradiation of a light including ultraviolet radiation.

OTHER EXAMPLE 1

In FIG. 2A, the counterbore 27A is formed at the second body portion 23 and the slit groove portion 27B is formed at the second body portion 23.

Figure 8A:
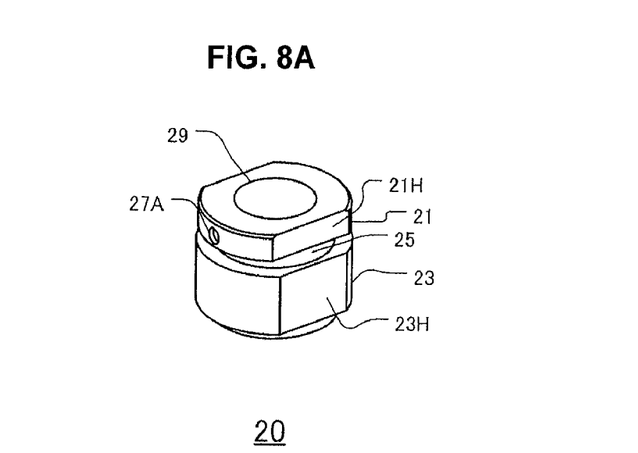
FIG. 8 explains a fixing base having a concave portion at a first body portion 21.
Figure 8B:
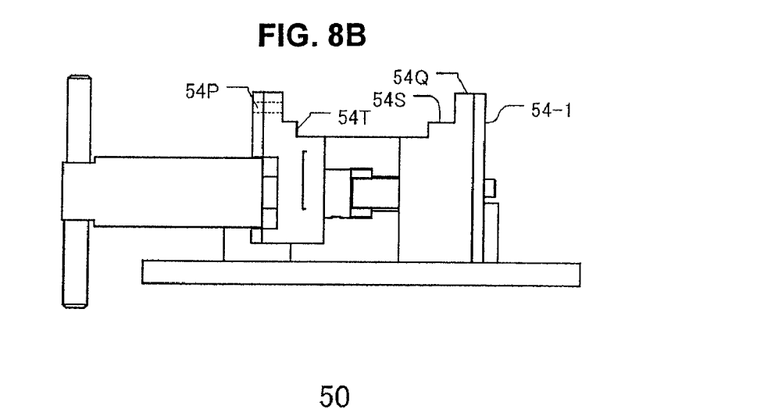

FIG. 8A shows an example that the counter bore 27A is formed at the first body portion 21. As FIG. 8A shows, the counter boring 27A is not formed on the second body, but it is formed on the first body. FIG. 8B shows a lamp holder 50 of another example . At the clamp portion 54-1 of the lamp holder 50, a rib portion 54Q which is projected to an upper side from the standard surface 54S is formed. At the rib 54Q, the plunger hole 54P, which receives the ball plunger BP1, is formed.

Figure 8C:
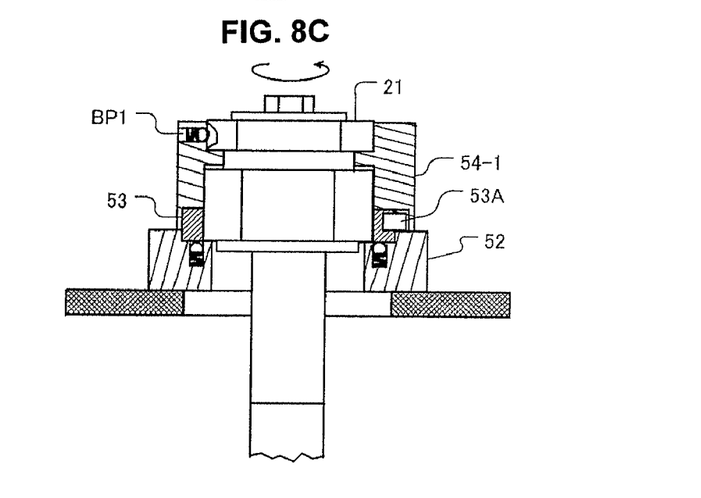

As FIG. 8C shows, the operators rotate the discharge lamp 10 90 degrees when it is fully inserted until the top of it at which point, the plunger BP1 attached to the clamp portion 54-1 enters the counterbore 27A formed at the first body portion 21.

OTHER EXAMPLE 2

Figure 9A:
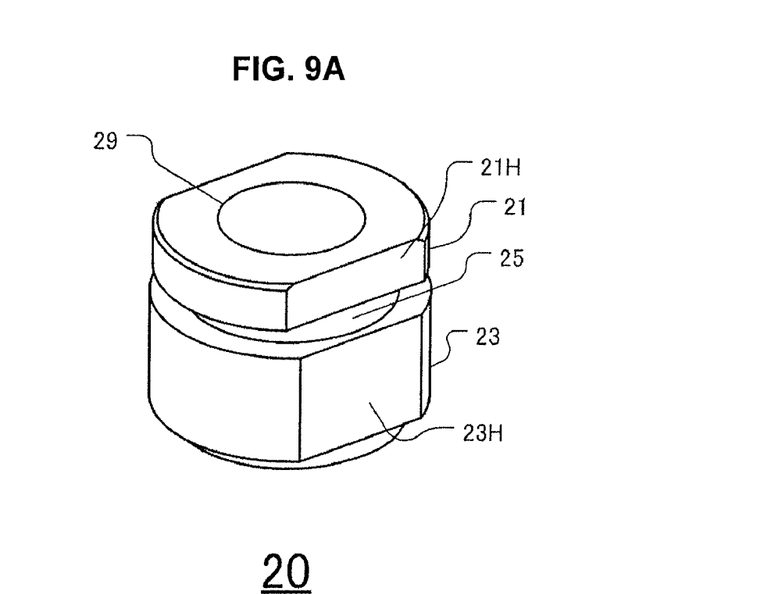
FIGS. 9A and 9B shows a fixing base 20 not having the concave portion and the back surface of the rotating ring.
Figure 9B:
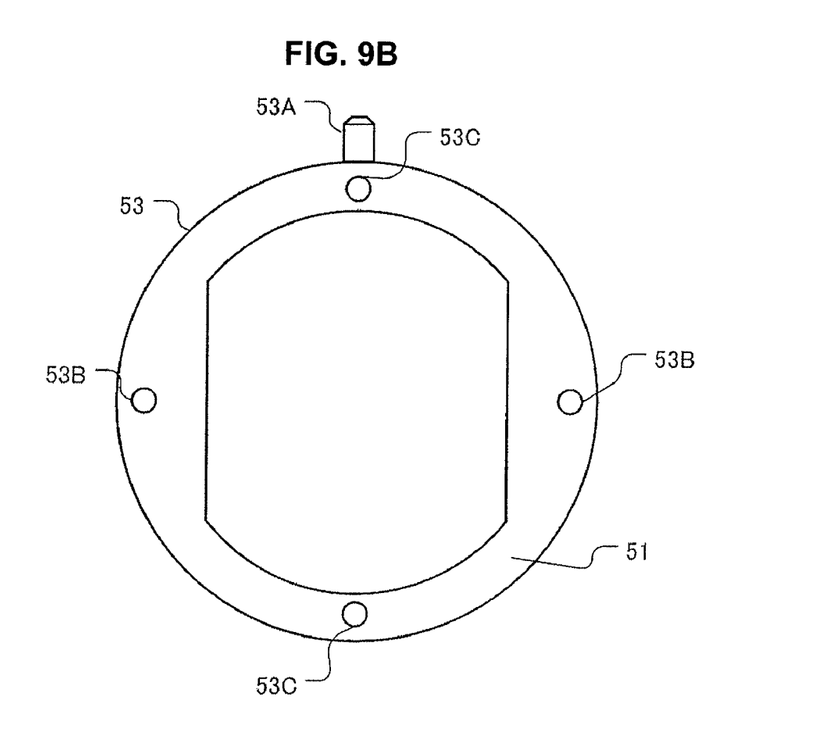

FIGS. 9A and 9B show an example 2 using a fixing base 20 without having the concave portion 27. In this case, the clamp portion 54 does not have the ball plunger BP1. Instead of that, on the bottom surface of the rotating ring 53, the counterbore 53C for the ball plunger BP2 attached to the rotating ring cradle 52 is formed.

The counterbore 53B of the rotating ring 53 retains the rotating ring 53 at the first position when the discharge lamp 10 is inserted. On the other hand, the counterbore 53B of the rotating ring 53C maintains the discharge lamp 10 at the second position which is 90 degrees from the first position around the axis. As mentioned, then discharge lamp 10 can have a fixing base 20 without having the concave portion 27.

<Structure of Light-Source Apparatus>

Figure 10:
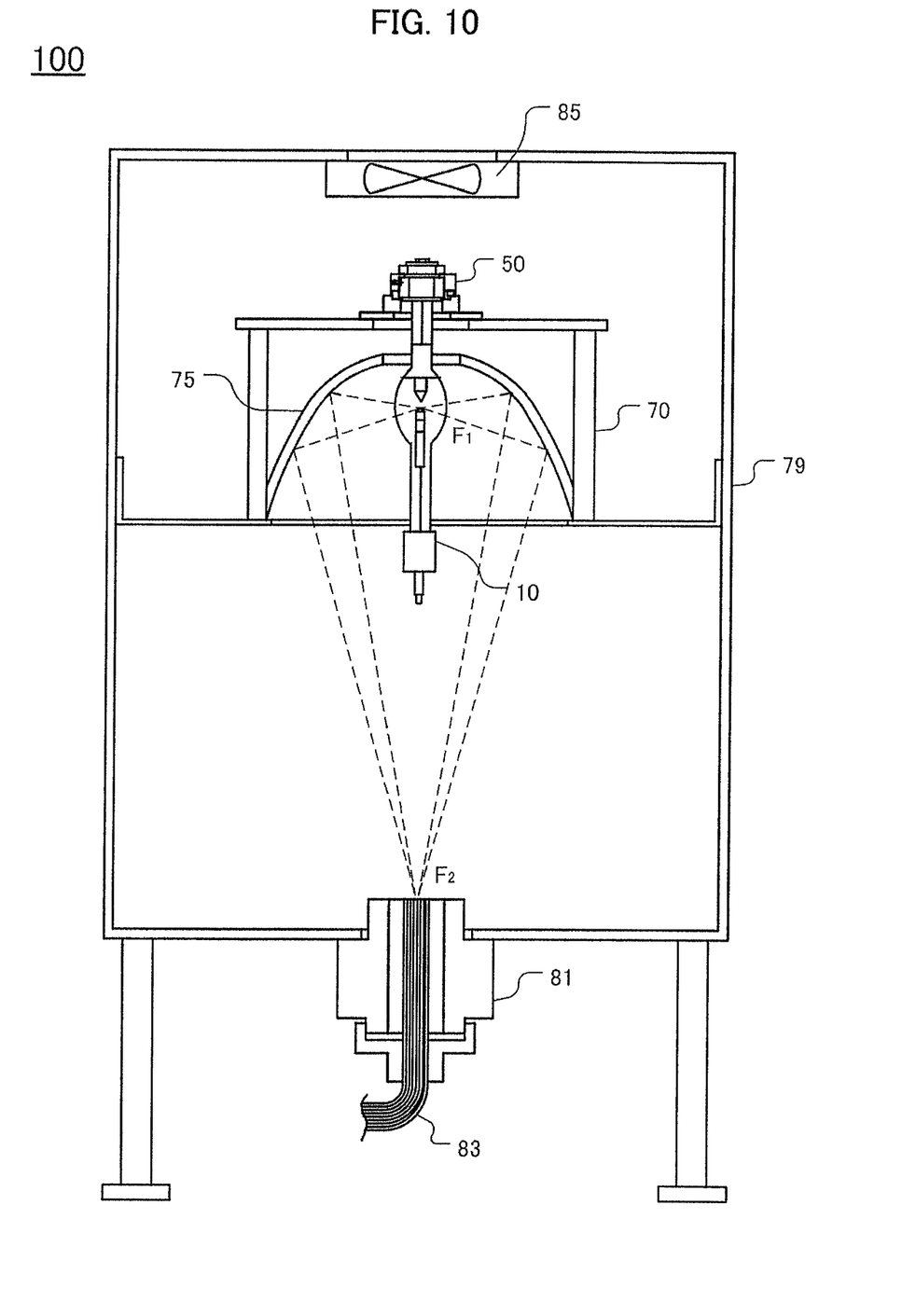
FIG. 10 shows one embodiment of a light-source apparatus having an optical fiber at an exit.

The light-source apparatus 100 of embodiments of the present invention is explained below. FIG. 10 shows an example of the light-source apparatus 100 having an optical fiber bundle 83 at an exit 81.

The light-source apparatus 100 of embodiments of the present invention comprises the discharge lamp 10 having a fixing base 20 on one end, a lamp holder attachment 70 attached to the lamp holder 10, and a housing 79. The lamp holder attachment 70 has a reflecting elliptic mirror, and the elliptic mirror 75 is placed with the bottom up. The discharge lamp 10 is attached from a bottom, and as mentioned above, the standard stepped surface 21B of the first body portion 21 at the fixing base and the standard surface 54S of the clamp portion 54 are attached to each other as they are dangled with their weights. A part of the light of the discharge lamp 10 irradiated from the first focal point F1 of the elliptic mirror 75 is reflected by the elliptic mirror 75 and headed to the exit 81. The second focal point F2 of the elliptic mirror is at the exit 81, and the light from the discharge lamp 10 is gathered to the exit 81. The optical fiber bundle can send out the light gathered by the second focal point F2. As a guide lighting member, besides optical fiber bundle 83, a lens or mirror can be used to guide the light.

As FIG. 10 shows, after attaching the one end of the optical fiber bundle 83 to the exit 81, the light led by the optical fiber is preferably irradiated from the end of the optical bundle 83 to the work. Also, the lamp holder attachment 70 comprises non-illustrated aperture portion to change numerical aperture. Attaching a cooling tan 85 to the housing 79 is preferred. And cooling the discharge lamp 10, the elliptic mirror 75, and a power supply 77 is preferred by evacuating the air inside of the housing 79 with the cooling tan 85,.

According to embodiments of the present invention, unless the operators insert the discharge lamp into the lamp holder until the predetermined position and rotate it, the discharge lamp cannot be clamped at the lamp holder. Therefore, such the discharge lamp having a fixing base is not attached in a wrong position.

Note that in some embodiments, the standard stepped surface 21B of the first body portion 21 at the fixing base 20 attach the standard surface 54S of the clamp portion 54 with the weight of the discharge lamp 10. However, not only is the discharge lamp 10 inserted from the bottom in the z-axis direction to the lamp holder 50, but the lamp holder attachment 70 is also arranged in the horizontal direction and discharge lamp 10 can be inserted to the lamp holder 50 in the horizontal direction. In this situation, the standard stepped surface 21B of the discharge lamp 10 can be attached to the standard surface 54S of the clamp 54 by using an electrical magnet or other connecting means.

What is claimed is:

1. A discharge lamp comprising:
 a fixing base disposed on an end of the discharge lamp, the fixing base being insertable into a lamp holder which includes a reference surface and a rotating portion, the rotating portion being rotatable from a first position to a second position and having an insert portion at an inner periphery of the rotating portion, the fixing base including:
 a first substantially cylindrical body portion having a cylindrical portion, and further including first and second notches positioned at a distance from one another on a periphery of the first substantially cylindrical body portion, the first and second notches being portions of the first substantially cylindrical body portion which extend radially to a lesser distance than the cylindrical portion of the first substantially cylindrical body portion;
 a second substantially cylindrical body portion which is positioned axially relative to the first substantially cylindrical body portion and has a cylindrical portion, the second substantially cylindrical body portion having third and fourth notches serving as joint surfaces, the third and fourth notches being positioned a distance from one another on a periphery of the second substantially cylindrical body portion, the third and fourth notches being portions of the second substantially cylindrical body portion which extend radially to a lesser distance than the cylindrical portion of the second substantially cylindrical body portion; and
 a groove portion formed in between the first and second substantially cylindrical body portions, the groove portion having a base with a diameter which is equal to or less than the distance between the first and second notches, and the groove having a sidewall formed by the first substantially cylindrical body portion; wherein
 the distance between the first and second notches is equal to or less than the distance between the third and fourth notches; and
 the diameter of the first substantially cylindrical body portion is equal to or less than the diameter of the second substantially cylindrical body portion; and wherein
 when the third and fourth notches contact the insert portion and the fixing base rotates, the third and fourth notches rotate the rotating portion of the lamp holder, and the groove sidewall formed by the first substantially cylindrical body portion contacts the reference surface of the lamp holder to fix the fixing base to the lamp holder.

2. The discharge lamp of claim 1, wherein the lamp holder further includes a clamp member which clamps the fixing base, and when the rotating portion is at the first position, the fixing base is not clamped by the clamp member, and when the rotating portion is at the second position, the fixing base is clamped by the clamp member.

3. The discharge lamp of claim 1, wherein the lamp holder further includes a plunger configured to retain a rotation position of the fixing base,
 at least one of the first and second substantially cylindrical body portions of the discharge lamp has a concave portion where the plunger enters, and
 when the rotating portion is at the second position, the concave portion receives the plunger.

4. The discharge lamp of claim 2, wherein the lamp holder further includes a plunger configured to retain a rotation position of the fixing base,
 at least one of the first and second substantially cylindrical body portions of the discharge lamp has a concave portion where the plunger enters, and
 when the rotating portion is at the second position, the concave portion receives the plunger.

5. The discharge lamp of claim 3, wherein the concave portion includes a counterbore or a slit groove which extends in an axial direction of the fixing base.

6. The discharge lamp of claim 4, wherein the concave portion includes a counterbore or a slit groove which extends in an axial direction of the fixing base.

7. The discharge lamp of claim 1, wherein a flat surface is formed on the insert portion of the rotating portion, the joint surface has a flat surface at at least one part, and the flat surface of the joint surface connects to the flat surface of the insert portion.

8. The discharge lamp of claim 2, wherein a flat surface is formed on the insert portion of the rotating portion, the joint surface has a flat surface at at least one part, and the flat surface of the joint surface connects to the flat surface of the insert portion.

9. The discharge lamp of claim 1, wherein a first mark indicating the first position and a second mark indicating the second position are formed on an outer surface of the rotating portion,
a window is formed in the lamp holder, and
the fixing base rotates the rotating portion so as to permit recognition of the change of the first mark to the second mark through the window.

10. The discharge lamp of claim 2, wherein a first mark indicating the first position and a second mark indicating the second position are formed on an outer surface of the rotating portion,
a window is formed in the lamp holder, and
the fixing base rotates the rotating portion so as to permit recognition of the change of the first mark to the second mark through the window.

11. A light-source apparatus having a light guiding member with an exit, the light-source apparatus comprising:
the discharge lamp of claim 1;
a mirror configured to reflect light irradiated from the discharge lamp;
a lamp holder into which the fixing base is insertable and fixable; and
a housing accommodating the discharge lamp, the mirror, and the lamp holder and having the exit formed thereof.

12. A light-source apparatus having a light guiding member with an exit, the light-source apparatus comprising:
the discharge lamp of claim 2;
a mirror configured to reflect light irradiated from the discharge lamp;
a lamp holder into which the fixing base is insertable and fixable; and
a housing accommodating the discharge lamp, the mirror, and the lamp holder and having the exit formed thereof.

13. A discharge lamp comprising:
a fixing base disposed on an end of the discharge lamp and insertable into a lamp holder that includes a reference surface and a rotating portion, the rotating portion being rotatable from a first position to a second position and having an insert portion at an inner periphery of the rotating portion, the fixing base including:
a first substantially cylindrical body portion having a first pair of notches formed at a periphery of the first substantially cylindrical portion;
a second substantially cylindrical body portion having a second pair of notches formed at a periphery of the second substantially cylindrical portion; and
a groove portion having a diameter equal to or less than a distance between the pair of first notches, the groove portion being formed between and along the periphery of the first and second substantially cylindrical body portions; wherein the distance between the pair of first notches is equal to or less than the distance between the pair of second notches, and the diameter of the first substantially cylindrical body portion is equal to or less than the diameter of the second substantially cylindrical body portion; and
when the second pair of notches contact the insert portion and the fixing base rotates, the second pair of notches rotate the rotating portion of the lamp holder, and an axial end surface of the groove at the first substantially cylindrical body portion side, the axial end surface contacting the reference surface of the lamp holder to fix the fixing base to the lamp holder.

14. The discharge lamp of claim 13, wherein the first pair notches is formed of surfaces parallel to one another, and the second pair of notches is formed of surfaces parallel to one another, wherein the surfaces of the first pair of notches are parallel to the surfaces of the second pair of notches.

15. The discharge lamp of claim 14, wherein the lamp holder further includes a plunger configured to retain a rotation position of the fixing base,
at least one of the first and second substantially cylindrical body portions of the discharge lamp has a concave portion where the plunger enters, and
when the rotating portion is at the second position, the concave portion receives the plunger,
wherein the concave portion includes a counterbore or a slit groove which extends in an axial direction of the fixing base.

16. The discharge lamp of claim 13, wherein the lamp holder further includes a plunger configured to retain a rotation position of the fixing base,
at least one of the first and second substantially cylindrical body portions of the discharge lamp has a concave portion where the plunger enters, and
when the rotating portion is at the second position, the concave portion receives the plunger,
wherein the concave portion includes a counterbore or a slit groove which extends in an axial direction of the fixing base.

17. A light-source apparatus comprising:
a light guiding member with an exit, the light-source apparatus comprising:
the discharge lamp of claim 13;
a mirror configured to reflect light irradiated from the discharge lamp;
a lamp holder into which the fixing base is insertable and fixable; and
a housing accommodating the discharge lamp, the mirror, and the lamp holder and having the exit formed thereof.

18. A light-source apparatus comprising:
a light guiding member with an exit, the light-source apparatus comprising:
the discharge lamp of claim 14;
a mirror configured to reflect light irradiated from the discharge lamp;
a lamp holder into which the fixing base is insertable and fixable; and
a housing accommodating the discharge lamp, the mirror, and the lamp holder and having the exit formed thereof.

* * * * *

UNITED STATES PATENT AND TRADEMARK OFFICE
CERTIFICATE OF CORRECTION

PATENT NO. : 7,946,733 B2
APPLICATION NO. : 12/049558
DATED : May 24, 2011
INVENTOR(S) : Katsumi Ashida It is certified that error appears in the above-identified patent and that said Letters Patent is hereby corrected as shown below:

Column 10, Claim 1 line 26, delete "in"

Signed and Sealed this
Twelfth Day of July, 2011

David J. Kappos
*Director of the United States Patent and Trademark Office*